United States Patent [19]
Kurth et al.

[11] Patent Number: 5,188,727
[45] Date of Patent: Feb. 23, 1993

[54] WATER FILTER UNIT

[75] Inventors: Mark Kurth; Andrew Alger; Lew Blahuta, all of Chicago, Ill.

[73] Assignee: Omni Corporation, Hammond, Ind.

[21] Appl. No.: 849,782

[22] Filed: Mar. 10, 1992

Related U.S. Application Data

[63] Continuation of Ser. No. 555,076, Jul. 18, 1990, abandoned.

[51] Int. Cl.⁵ .................... B01D 24/10; B01D 27/00
[52] U.S. Cl. .................................. 210/85; 210/282; 210/284; 210/449; 40/495
[58] Field of Search .............. 210/85, 138, 252, 256, 210/259, 264, 282, 284, 323.2, 449, 488; 40/493, 495

[56] References Cited

U.S. PATENT DOCUMENTS

| | | | |
|---|---|---|---|
| 452,671 | 5/1891 | Harding | 40/495 |
| 1,253,562 | 1/1918 | Applebaum | 40/495 |
| 3,653,514 | 4/1972 | Holler et al. | 210/281 |
| 3,802,563 | 4/1974 | Sasaki et al. | 210/472 |
| 4,138,337 | 2/1979 | Smith | 210/282 |
| 4,681,677 | 7/1987 | Kuh et al. | 210/282 |
| 4,683,054 | 7/1987 | Turnbull | 210/282 |
| 4,713,175 | 12/1987 | Bray | 210/282 |
| 4,759,844 | 7/1988 | Lipshultz | 210/282 |
| 4,895,648 | 1/1990 | Hankammer | 210/472 |
| 4,909,931 | 3/1990 | Bibi | 210/85 |

Primary Examiner—Peter Hruskoci
Assistant Examiner—Robert James Popovics
Attorney, Agent, or Firm—Leydig, Voit & Mayer

[57] ABSTRACT

An improved water filter unit including a casing having a removable snap-type cover with the casing mountable to a surface or free standing. The casing including a plurality of removable different type water filter cartridges, each of which includes a pair of different water filters, connected to a manifold formed in the casing. The casing including a pair of change water filter indicators.

8 Claims, 4 Drawing Sheets 5,188,727

WATER FILTER UNIT

RELATED APPLICATIONS

This is a continuation of copending application Ser. No. 07/555,076 filed on Jul. 18, 1990 (now abandoned).

FIELD OF THE INVENTION

The present invention relates generally to a water filter unit, and more particularly is directed to a water filter unit having a plurality of different filter cartridges in series, each having a related change filter indicator, mounted in a casing having a snap on type cover, with a manifold connecting the filter cartridges.

BACKGROUND OF THE INVENTION

Water filters have been utilized to filter the entire water stream entering a residence or place of business, continuously or upon demand. The water filter removes particles, and/or chemicals and/or metals from the water stream, especially for drinking purposes.

Typically, commercial prior art water filters include only a single filter, typically formed with charcoal as the filter medium. Such water filters are not as efficient as desired. The prior art water filters also typically are designed to be mounted under the sink and are permanently coupled into the water stream.

It would be desirable to provide a water filter unit which includes a plurality of different filter units for the water stream, provides filtered water on demand and which has a cabinet which can be free standing or otherwise mounted as desired.

OBJECTS AND SUMMARY OF THE INVENTION

It is, therefore, a primary object of the present invention to provide a water filter unit having a plurality of filters in series in the water stream to reduce metals, chemicals, bad taste and odors in the water.

A further object of the present invention is to provide a cabinet or casing into which the filters are mounted, which can be free standing or mounted as desired and includes a snap-type cover.

It is yet another object of the present invention to provide a separate change filter indicator for each water filter.

In general, the present invention contemplates a water filter unit having a casing with a snap-type cover, the casing being adapted to be mounted to a convenient surface or to be free standing as desired. The casing includes mounting brackets for a pair of water filter cartridges, which water filter cartridges are connected by a cross-connector or manifold, preferably formed integrally in the body of the casing. The casing includes a pair of change filter indicators, one for each water filter cartridge.

These and other features and advantages of the invention will be more readily apparent upon reading the following description of a preferred exemplified embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

Figure 1:
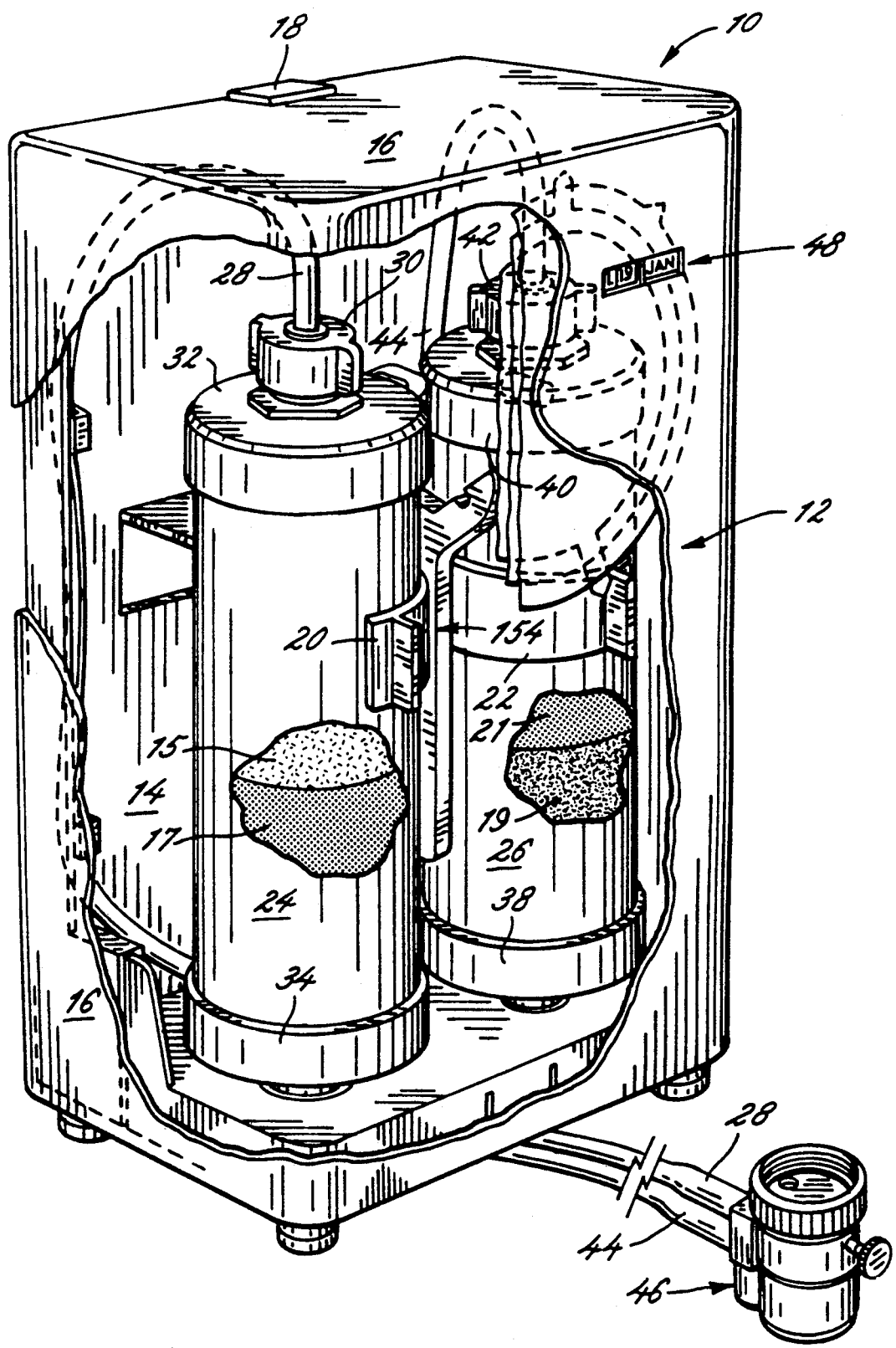
FIG. 1 is a perspective view of the water filter unit of the present invention with the snap-type cover partially cut away for illustration purposes.

Turning to the drawings, there is shown in FIG. 1 a water filter unit of the present invention generally indicated by the reference numeral 10. The water filter unit includes a cabinet or casing 12, which includes a casing base and rear wall portion 14 and a snap-type cover 16. The cover 16 includes a resilient snap catch release 18, which will be described in detail with respect to FIG. 4. Any type of removable cover could be utilized.

The rear wall portion 14 includes a pair of bracket arms 20, 22 into which are mounted a pair of water filter cartridges 24, 26. The water filter unit 10 includes a water stream inlet tube 28, which terminates in a coupling 30, which in turn is removably connected to an inlet end 32 of the water filter cartridge 24. The water filter cartridge 24 preferably includes a pair of stages including a first large particle prefilter 15 and a second reduction filter 17 for reducing chemicals, bad taste and odors from the water. Preferably, the water filter cartridge 24 is a replaceable cartridge, Model Number TC-2 water filter produced by the assignee of the present application, Omni Corporation of Hammond, Indiana.

Figure 5:
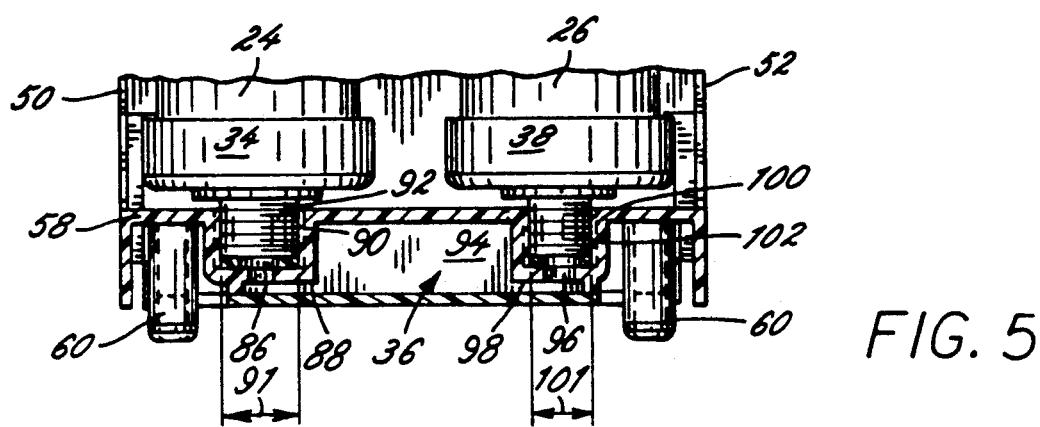
FIG. 5 is a partial cross-sectional view of the water filter unit shown in and taken along the line 5—5 in FIG. 3.

The filtered water stream flows out of the water filter cartridge 24 through an outlet end 34 connected or mounted into a connector or integral manifold 36, as best described with respect to FIG. 5. The water stream passes through the integral manifold into an inlet end 38 of the water filter cartridge 26, also connected or mounted into the connector or integral manifold 36. The water filter cartridge 26 is different from the water filter cartridge 24 and also preferably is a two stage water filter, a first lead and heavy metal filter 19 and a second final water filter 21 for removing fine particles. Preferably the water filter cartridge 26 is a replaceable cartridge, Model Number TC-1 water filter also produced by the assignee of the present invention. The multiple different water filters provide a greatly enhanced water filtration over the prior art single medium filters. The water filter cartridges 24 and 26 are connected through the manifold 36 without valving.

The water stream then passes out of the water filter cartridge 26 through an outlet end 40 via a removable coupling 42 into a water outlet or dispensing tube 44. The tubes 28 and 44 are connected to a conventional water faucet connector 46 which provides the filtered water stream on demand as will be best described with respect to FIG. 11. The casing 12 also preferably includes a change filter indicator 48, best described with respect to FIGS. 8 and 9.

Figure 2:
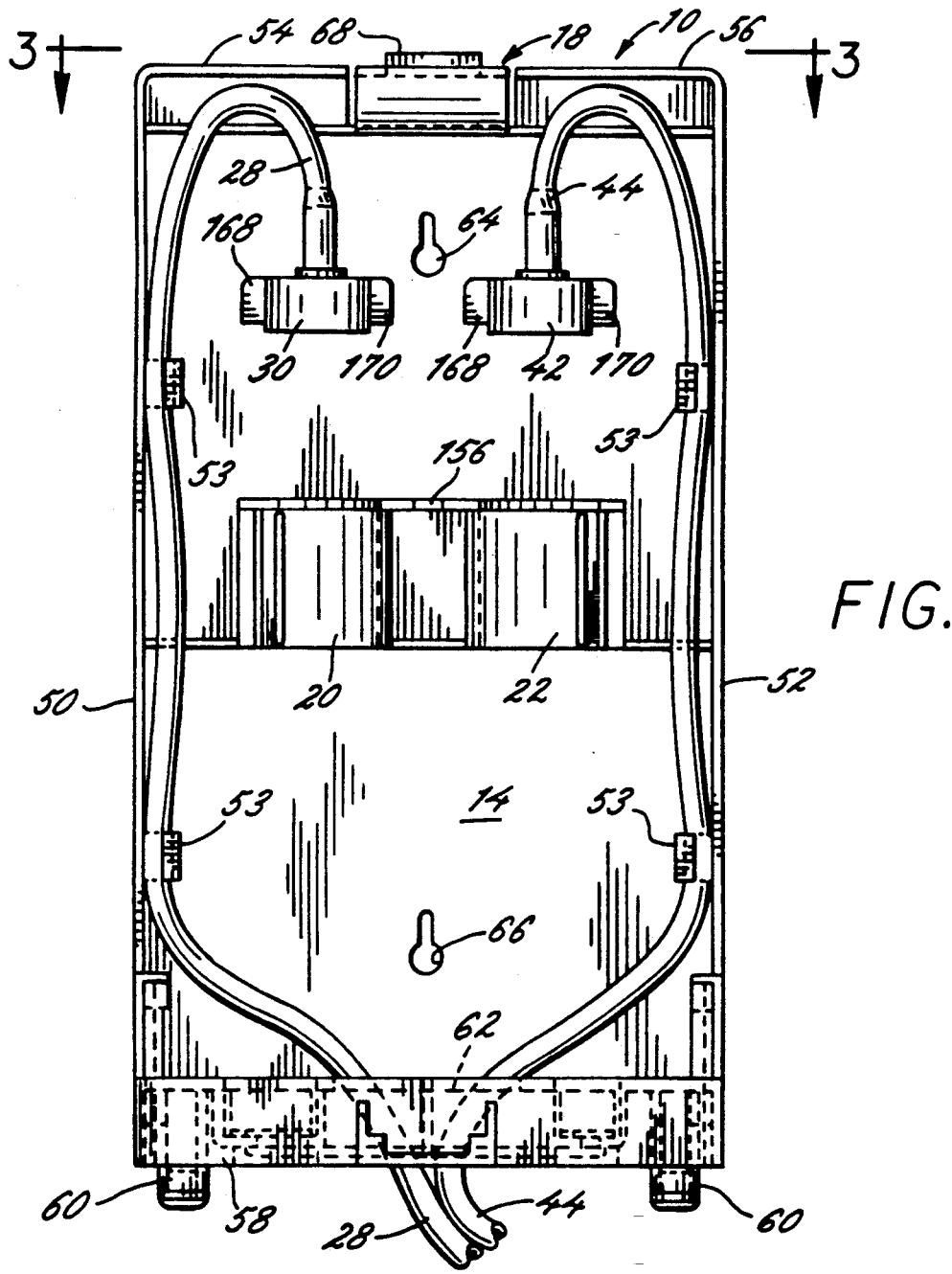
FIG. 2 is a front plan view of the water filter unit of FIG. 1 with the water filter cartridges and snap-type cover removed.

The rear wall portion 14, without the water filter cartridges 24, 26 and the snap-type cover 16 is best illustrated in FIG. 2. The bracket arms 20 and 22, preferably are formed integrally with the wall portion 14 and extend therefrom to support the water filter cartridges 24 and 26, removed from this view. The water stream inlet and outlet tubes 28, 44 are mounted to respective side walls 50, 52, such as by clips 53. The side walls 50, 52 also preferably integrally are formed with the wall portion 14 and with respective top wall portions 54, 56. The wall portions 50, 52, 54 and 56 provide structural strength for the rear wall portion 14, which also includes a casing base 58. The base 58 includes a plurality of feet 60 which provide the free standing capability of the water filter unit 10.

The base 58 includes an aperture or opening 62, through which the inlet and outlet tubes 28, 44 extend. The feet 60 provide space for the tubes 28, 44, when the water filter unit is standing on a surface, not illustrated. The wall portion 14 also includes a pair of slotted apertures 64, 66 for the wall mounting of the water filter unit 10. The apertures 64, 66 can be fitted over screw or bolt heads to provide a secure wall or other surface mounting in a conventional manner.

Figure 3:
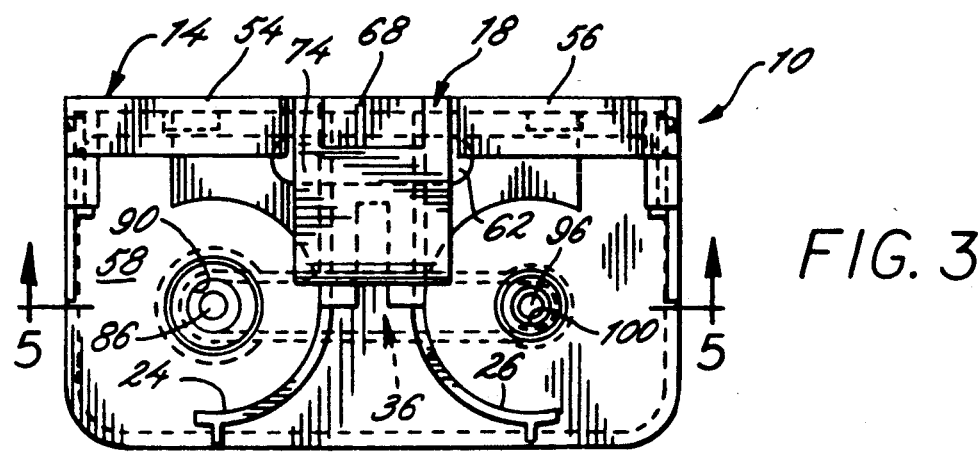
FIG. 3 is a top plan view of the water filter unit of FIG. 1.
Figure 4:
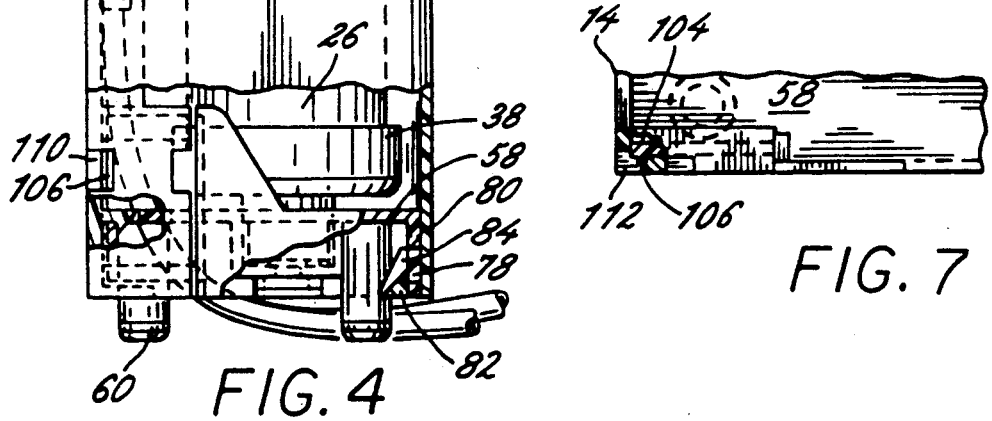
FIG. 4 is a side plan view, partially in section, of the water filter unit of FIG. 1.

The wall portion 14 also includes the snap release mechanism 18 for the snap-type cover 16, best illustrated in FIGS. 2-4. The snap-type cover 16 includes a detent 70 recessed in a top cover portion 72. The snap release mechanism 68 includes an integral arm 74 biased against the top cover portion 72, with a slot or aperture 76 formed in the arm 74 to engage the detent 70. To release the snap-type cover 16, a pad or button 68 is depressed to release the detent 70.

The base portion 58 includes a tab 78 formed in a front edge 80 thereof. The tab 78 engages a clip 82 formed in the bottom of cover 16 to secure the cover 16 to the casing 12. The clip 82 is attached to the cover 16 by a pair of side walls, one of which 84 is illustrated in FIG. 4.

Referring now to FIG. 5, the manifold 36 integrally formed in the base 58 is best illustrated. The manifold 36 includes an inlet 86 which is formed in a closed end 88 of a threaded passageway 90. The water filter outlet 34 includes a male fitting 92, which is screwed into the passageway 90 to secure the water filter cartridge 24 in communication with the manifold 36.

The manifold 36 includes a passageway or connection 94 which allows the water to flow from the inlet 86 to an outlet 96. The outlet 96 also is formed in an end 98 of a second threaded passageway 100 into which a male fitting 102 of the water filter inlet 38 is screwed. Furthermore, the diameter 91 of passageway 90 is not the same as the diameter 101 of passageway 100, which insures the proper water filter cartridge connection.

Figure 6:
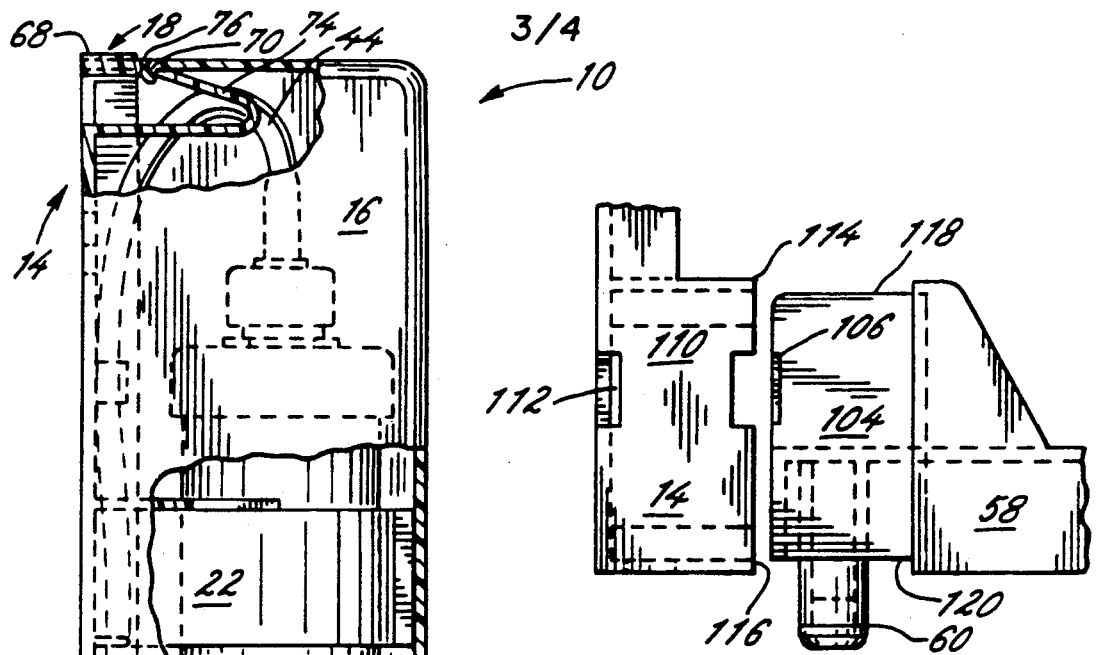
FIG. 6 is a partial side plan view of the casing base and rear wall portion of the present invention disconnected from one another.
Figure 7:
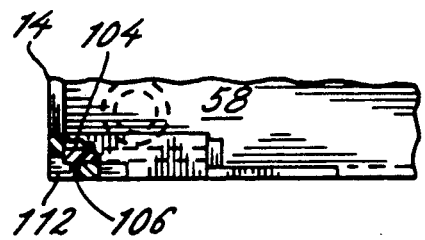
FIG. 7 is a partial top plan view of the casing base and rear wall portion partially in section connected to one another.

FIGS. 6 and 7 best illustrate the connection of the back wall portion 14, with the preferably separate base portion 58. The base portion 58 includes a recessed portion 104 having a tab 106 on a rear edge 108. The wall portion 14 includes a portion 110 which mates with the recessed portion 104. The portion 110 includes an aperture 112 into which the tab 106 is secured. To further secure and align the portions 14 and 58, the portion 110 includes lips or channels 114 and 116, which slide over respective top and bottom edges 118, 120 formed on the portion 104. The portions 14 and 58 also could be formed integrally or could be adhesively secured to one another.

Figure 8:
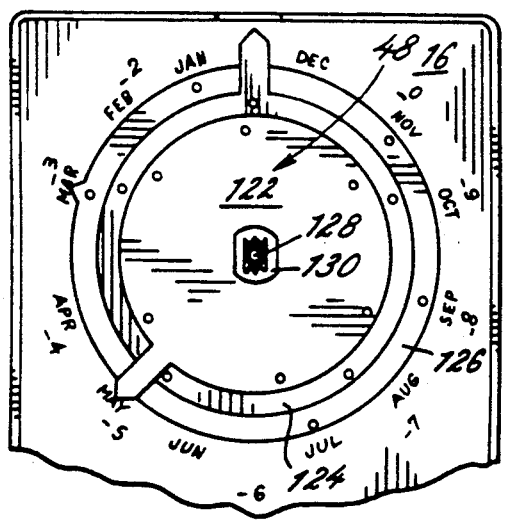
FIG. 8 is a plan view of one embodiment of the internal change filter indicator mechanism of the present invention.
Figure 9:
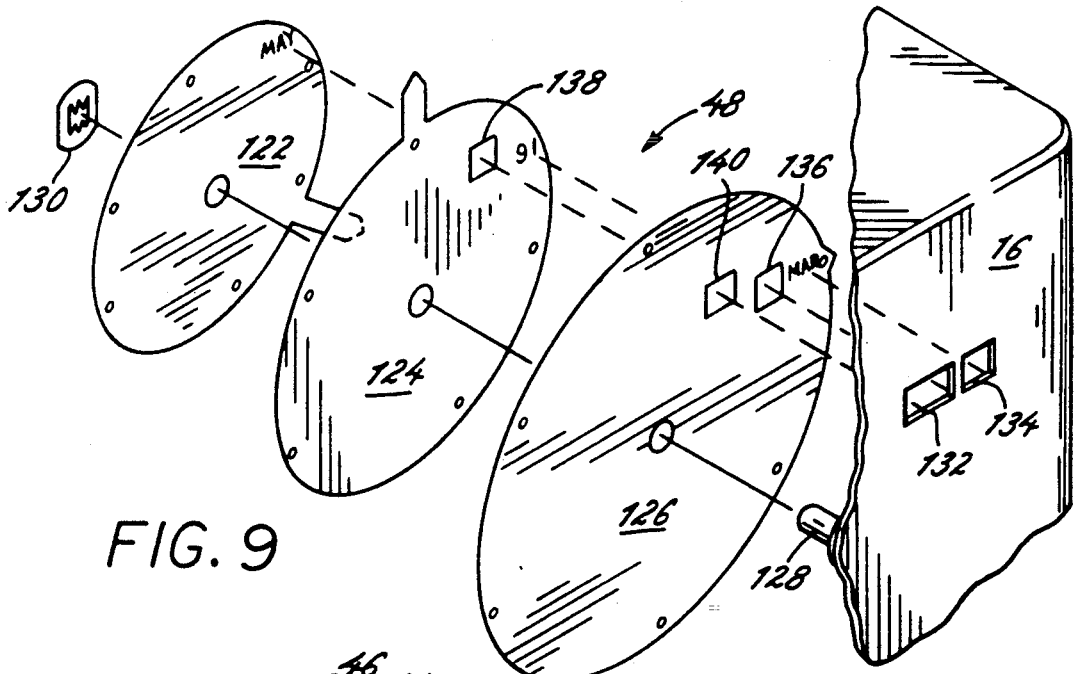
FIG. 9 is an exploded perspective view of the change filter indicator mechanism of FIG. 8.

The change filter indicator 48 is best shown in FIGS. 8 and 9. The change filter indicator 48 could be formed in numerous ways, however, for example purposes, the change filter indicator 48 includes three separate discs 122, 124 and 126. Each disc 122, 124, and 126 is mounted for rotation onto a post 128, formed or secured on the inside of the cover 16. The discs 122, 124 and 126 can be secured on the post 128 by a removable clip 130. The change filter indicator 48 includes two apertures 132 and 134 through which the months and years can be exhibited for the two filters. Preferably, the aperture 134 displays the month in which a first one of the water filter cartridges should be changed. The months of the year are printed on the outer edge of the disc 126, which is rotated to the proper month when the first water filter cartridge is installed or changed. The month and year for the second filter cartridge change are displayed through the aperture 132. The years are printed on the outer edge of the disc 124 and are displayed through one of a plurality of holes 136 (only one of which is illustrated) in the disc 126. The months are printed on the outer edge of the disc 122 and are displayed through one of a plurality of holes 138 (only one of which is illustrated) in the disc 124 and through the same hole 136 (if elongated) or a separate hole 140 in the disc 126.

Figure 11:
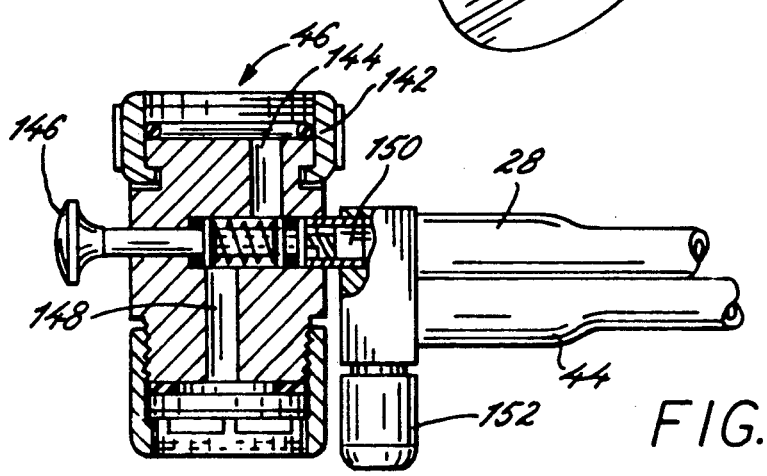
FIG. 11 is a side, partially sectional view of one water stream connector for use with the present invention.

Referring to FIG. 11, the water faucet connector 46 is best illustrated. The water faucet connector 46 can be any type of water faucet connector, but for example purposes, the water faucet connector 46 includes a fitting 142 which is screwed onto a standard water faucet. If the water faucet connector 10 is not being utilized, the water flows through a passageway 144, past a connecting pin 146 and out a passageway 148.

When it is desired to utilize the water faucet connector 10, the connecting pin 146 is pulled to block the passageway 148 and the water flows into a passageway 150 and then into the water inlet tube 28. The filtered water then is discharged through the water outlet tube 44 through a nozzle 152.

Figure 10:
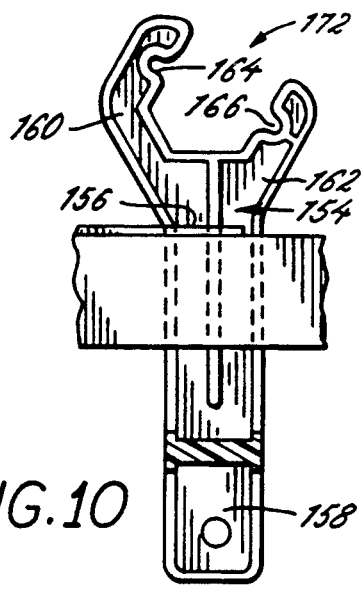
FIG. 10 is a plan view of a water filter change tool for use with the present invention.

Referring to FIG. 10, a water filter cartridge change tool 154 is illustrated, secured when not in use between the brackets 20 and 22 in a slot 156 (see FIG. 2). The change tool 154 includes a handle 158 and a pair of outlet arms 160 and 162. Each arm 160, 162 has a respective slot 164, 166 formed therein, which slots 164, 166 mate to respective flanges 168, 170 on each of the couplings 30 and 42 (see FIG. 2). The change tool 154 preferably is formed of plastic and has an open mouth 172 so that the change tool 154 easily can be utilized with the couplings 30 and 42.

We claim as our invention:

1. A water filter unit for use with a water source, comprising:

at least a first and a second water filter cartridge connected in series by a manifold, said first water filter cartridge having a water inlet at one end and an outlet at the opposite end constructed and arranged to be threadably connected to said manifold, said second water filter cartridge having a water inlet at one end constructed and arranged to be threadably connected to said manifold and a water outlet at the opposite end, and being different in filtration media from said first water filter cartridge;

a unit casing comprising a base portion and a rear wall portion, the wall portion having bracket arms for holding the water cartridges;

said manifold integrally formed in said casing base portion with a threaded inlet threadably connected to said first water filter cartridge outlet and a separate threaded outlet threadably connected to said second water filter cartridge inlet and a single passageway connecting the threaded inlet and outlet, the threaded inlet and outlet being of a different diameter to ensure proper cartridge placement;

and each of said water filter cartridges are threadably engageably respectively in said manifold threaded inlet and outlet;

a detachable cover having front, side and top walls secured with tabs or clips attached to said casing for easy detachment and re-attachment for enclosing said water filter cartridges in said casing;

a water faucet connector having a faucet connector inlet for connecting to the water source, a faucet connector outlet and at least two flexible tubes, the first tube connecting the faucet connector inlet and the water inlet of the first water filter cartridge and the second tube connecting the water outlet of the second water filter cartridge and the faucet connector outlet; and clip means mounted on the casing for holding the tubes.

2. The water filter unit of claim 1 wherein said casing includes a manually adjustable change filter indicator for each of said water filters to conveniently display the calendar times that the filter needs to be changed.

3. A water filter unit as claimed in claim 2 wherein said change filter indicator means includes a pair of rotatable disc members respectively for displaying calendar time of filter change.

4. The water filter unit of claim 1 wherein each of said water filter cartridges includes at least two different water filtration media in series therein.

5. A water filter unit for use with a water source including a plurality of replaceable filter cartridges, comprising:

a casing with a detachable cover secured with taps or clips attached to said casing for easy detachment and re-attachment for removing and replacing said water filter cartridges and an adjustable change filter indicator to conveniently display when each of the filter cartridges needs to be changed, said casing comprising a base portion and rear wall portion, the wall portion having bracket arms for holding the water cartridges, and including means for mounting said rear wall portion to a convenient surface and means for free standing said base portion on a surface, removable cover means for attachment to the base and rear wall portion;

a manifold integrally formed in said casing base portion, with a threaded inlet and a separate threaded outlet and a single passageway connecting the threaded inlet and outlet, the threaded inlet and outlet being of a different diameter to ensure proper filter placement, and each of said water filter cartridges are threadably engageable respectively in said manifold threaded inlet and outlet;

said water filter cartridges constructed and arranged to be detachably mounted in said casing manifold in series, one in said manifold inlet and one of said manifold outlet, said first water filter cartridge having a water inlet at one end and an outlet at the opposite end constructed and arranged to be threadably connected to said manifold threaded inlet, said second water filter cartridge having a water inlet at one end constructed and arranged to be threadably connected to said manifold threaded outlet and a water outlet at the opposite end, said first and second water filter cartridges being different in function and capability from one another;

a water faucet connector having a faucet connector inlet for connecting to the water source, a faucet connector outlet and at least two flexible tubes, the first tube connecting the faucet connector inlet and the water inlet of the first water filter cartridge and the second tube connecting the water outlet of the second water filter cartridge and the faucet connector outlet; and clip means mounted on the casing for holding the tubes.

6. The water filter unit of claim 5 wherein said adjustable change filter indicator includes means for each of said water filter cartridges to conveniently display the calendar times when the filter needs to be changed.

7. A water filter unit as claimed in claim 6 wherein said change filter indicator means includes a pair of rotatable disc members respectively for displaying calendar time of filter change.

8. The water filter unit of claim 5 wherein each of said water filter cartridges includes at least two different water filtration media in series therein.

* * * * *